G. W. KNAPP.
Corn Planter.
No. 65,755.
Patented June 11, 1867.
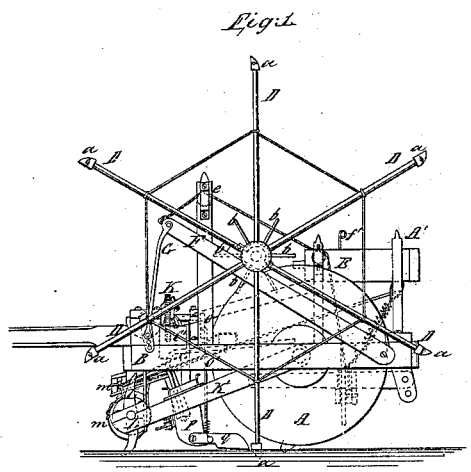
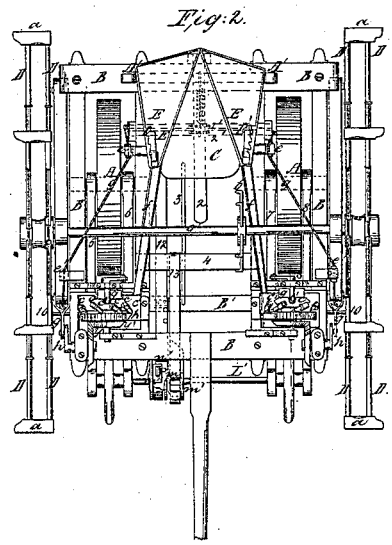
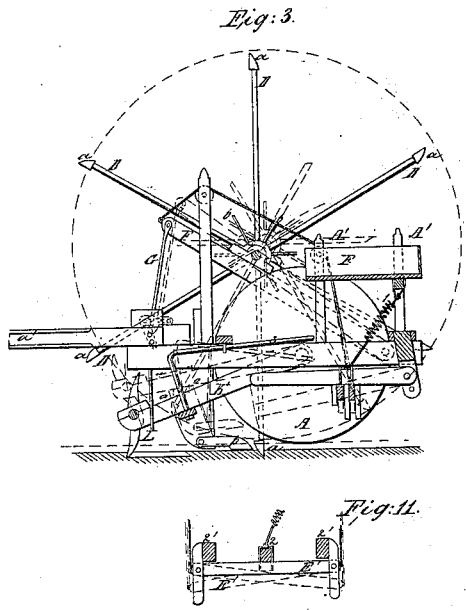
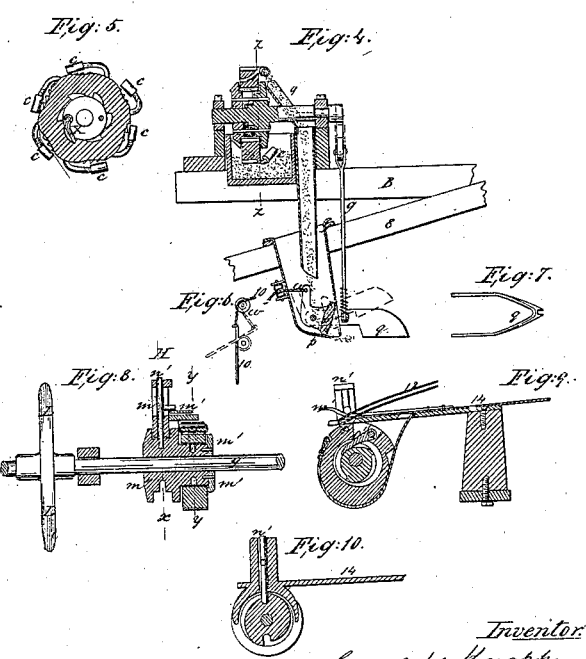
Inventor:
George W Knapp
per Attorney

United States Patent Office.

GEORGE W. KNAPP, OF CORNING, NEW YORK.

Letters Patent No. 65,755, dated June 11, 1867.

IMPROVEMENT IN CORN-PLANTERS.

*The Schedule referred to in these Letters Patent and making part of the same.*

TO ALL WHOM IT MAY CONCERN:

Be it known that I, GEORGE W. KNAPP, of Corning, in the county of Steuben, and in the State of New York, have invented certain new and useful "Improvements in Seed and Corn-Planters;" and I do hereby declare that the following is a full, clear, and exact description thereof, reference being had to the accompanying drawings, forming a part of this specification.

My invention principally consists in the mode of spacing the ground for planting by means of a reel at each side of the machine, the reel-marker being so constructed and connected as to also operate the mechanism for feeding and dropping the seed; and also being provided with flexible bearings so as to yield to obstructions, and be capable of being raised up out of the way when the machine has to be turned or moved from the field; also in the construction and operation of the double-ended furrower, by which I am enabled to turn the "furrower," end for end, and thus easily keep it from clogging with soil or grass; also in the construction and operation of the device used for feeding the seed from the seed-tubes into the furrow; also in the construction and operation of the device used for feeding the seed from the seed-box into the seed-tubes, by means of revolving seed-buckets; also in the construction and arrangement of the devices used for carrying the seed from the supply-box in rear of driver to the feed-boxes; also in the construction and arrangement of the levers used for raising and lowering the "spacer" or "marker;" also in the mode of constructing and operating the covering-hoes; all of which will more fully hereinafter appear by reference to the following description and drawings, in which—

Figure 1 is a side elevation.

Figure 2 is a plan view.

Figure 3 is a vertical section through the supply seed-box; the red lines showing the operation of the marker, and also of the double-ended furrower.

Figure 4 is a detail section, showing the operation of the seeding device.

Figure 5 is a detail section, showing the revolving seed-buckets.

Figure 6 is a detail, showing by red lines the operation of seed-discharge more fully shown in fig. 4.

Figure 7 shows the scraper.

Figure 8 shows the operative mechanism of the double-ended furrower.

Figure 9 is a section through $y\ y$ of fig. 8.

Figure 10 is a section through $x\ x$ of fig. 8.

Figure 11 is a detail of the cross-levers; for

To enable others skilled in the art to make and use my invention, I will proceed to describe its construction and operation.

In the construction of my invention, in fig. 1, A, the wheels, with chute-axles, having their bearings in frames B and B'. The rear ends of levers 5, 6, 7, and 8, are attached to said axles, and swing on them as they are raised or lowered in front. Above the wheels is elevated the seat C, and seed-boxes E E, having valves E' and E', with a handle projecting above seed-boxes, as seen in fig. 1 at $f'$. The seed-boxes are fastened to a frame, A', set into frame B, and under the valves E' is connecting-spouts $f$, which convey the seed to the hopper containing the revolving lifting feed-tubes $c\ c\ c\ c\ c$. The tube-buckets are screwed on arms attached to the wheel K, on which wheels are cog-gearing, and are made to revolve by means of the arms D D, as they come in contact with the ground, and the weight of the machine is arranged to bear partly on said arms. The force from this means is communicated to the wheel K by an arm $g$, attached to the lever F, to which the shaft $g'$, of said arms D D D, is fastened by bearings. The lower end is fixed to a crank, $h$, which turns the cogged segment of the wheel Y, and which segment gears into wheel Y', a portion of which is smooth, and thus revolves the feed-buckets $c\ c\ c\ c$, lifting up the seeds, and emptying them into the hopper 9, from which they are regularly discharged by a valve, P, at the bottom of the same, by the arms D, striking the valve-rods 10. The feed-buckets are screwed to the arms, and can be graduated to discharge the quantity of seed I may wish to deposit by the screws on said arms of feed-buckets $c\ c\ c\ c$.

The lever 2 is under the feet of the driver, and is attached to two levers seen in dotted lines in fig. 2, 2' 2'. One end of each is attached to cords $g$, which pass over pulleys $e\ e$, and $e'\ e'$, to the end of the lever F, where it is fastened, and can be operated by the driver for raising the bearings of the revolving arms D D D. The lever 3, in fig. 2, is for elevating the seed-valves, the furrowers, and scrapers, and is also operated on by the driver. The arms $b\ b\ b$, on shaft $g'$, is also under the control of the driver, by which he can regulate the arms D D D. On these arms are heads, $a$, which serve for markers when they enter the ground. The elastic strap 12, at the rear end, is fastened to the seat, and extends forward, and is attached to a slide, $m$, in figs. 1 and 2; and the elastic band 13 is passed around the brace 4, and over the cylinder $m'$, on the arm $L'$. These devices are for relieving the furrowers, if it is desirable for them to revolve, on coming in contact with great resistance. $q\ q$, in fig. 1, the scrapers for covering the grain when deposited.

In fig. 3, similar parts are designated by the same figures and letters. The red lines show the machine thrown up, or out of working order, in being removed from the field.

In fig. 4, like letters and figures designate like parts, and in which, in section, are more clearly shown the hopper, revolving-buckets, discharge-tubes, and scrapers. The red lines show the scrapers elevated.

Fig. 5 is a section, through Z Z, of fig. 4, showing the catch $x$, which is an eccentric, catching on the shaft passing through wheel K, and which gives an intermitting motion to the feed-buckets $c\ c\ c\ c$.

Fig. 6 shows a detached portion of the feed-discharge 10, in fig. 2. The red lines show the change of position in the operation of discharging.

In fig. 7, a detached plan view of the scrapers $q\ q$.

In fig. 8 is shown in section the machinery for operating the furrowers L L, with slides $m$ and $n'$, for holding or relieving the shaft of the furrowers.

In fig. 9 is shown in section on a line of $y\ y$, through fig. 8, in which the like parts are designated by the same letters as in figs. 1 and 2.

Fig. 10 is a section through the line of $x\ x$, in fig. 8, in which like parts are designated by the same letters as before named.

In fig. 11 is detailed in section the treadle-levers $e'\ e'$, shown in dotted lines in fig. 2, underneath the seat and seed-boxes.

In the operation of my invention, the seed is placed in the seed-boxes E E, on each side of the seat C, and the driver has entire control of the flow of the seed, by means of the levers $f'$ attached to valves $E'\ E'$ The flow is graduated by letting the levers $f'$ catch in the ratchets seen at $E'\ E'$ also. The weight of the whole machine rests on the wheels generally, and they are used for carrying forward the same; yet, when desired, a portion of the weight is caused to bear on the arms D D D, with heads, $a$, which have their fulcrum raised or lowered by the driver pressing his weight on lever 2, under the seat, which pressure tightens the cords $g$, in fig. 2, and elevates the front ends of the bearings or levers F. As these arms press on the ground, motion is, by means of the connecting-rods G, attached to crank-shafts, H, which gives motion to the feed-buckets $c\ c$, and scrapers, thus carrying up the seed out of the hoppers $c'\ c'$, into which it had been conveyed from the seed-boxes through the troughs $f\ f$; and when elevated, the buckets discharge the seed into spouts 9 9, and from which it is regularly discharged by one of the arms D, tripping regularly in their revolutions. The valve-rods 10, on each side of the machine, as seen in fig. 2, thus opening the valves, and letting out the seed, and then closing by means of its own gravity, or the elastic spring-rope W, attached to the discharge levers 11, and valves $p$. It will be seen that the driver can regulate the arms, in starting the machine, by means of the handles $b\ b\ b$, and when he has set the same, to begin planting. The heads on the arms D D D always indicate where to deposit the seed. At the same time the arms then resting on the ground trip against the discharge levers 10, and allows the discharge of seed as before described. And as soon as the seed is discharged, the scrapers $q\ q$ are depressed by means of the connecting-rods on cranks O and $O'$, fig. 1, and cover over the seed thus deposited. The furrowers L L are held firmly in their place by pin $n'$ in the collar $m''$, on the shaft $g'$, and the ratchet in collar $m'$, on said shaft, to allow the furrowers to open the ground for to receive the seed. These fastenings are readily detached, if the furrowers comes in contact with any great resistance, by the driver pressing hard on the strap 12, which draws back the sliding-cam $m$, and raises the pin $n'$, and revolve forward the collar $m'$, to which its front end is attach, and relieves the ratchet seen in fig. 9, at $o''$, when the furrowers revolve and is freed from breaking, and the other ends do the work. The elastic band 13 directly flies back and locks the furrowers as before. By pressure on the levers 2 and 3, the machine is thrown out of gear, (see fig. 3, red lines.) By means of the segment gear-wheel, $y'$, I regulate the dropping by depositing the seed at regular intervals in the tube 9.

Having thus fully described the construction of my invention, and its operation, what I claim as new, and desire to secure by Letters Patent, is—

1. The adjustable revolving-arms D D, constructed and operating as described, and for the purposes set forth.

2. The revolving-wheel K, and feed-buckets $c\ c\ c\ c$, constructed and operating as described, and for the purposes set forth.

3. The automatic valves P P, as described, and for the purposes set forth.

4. The automatic scrapers $q\ q$, constructed and operating as described, and for the purposes set forth.

5. The treadle-levers 2 and 3, with levers $2'\ 2'$, for elevating the arms D D D, &c., the furrowers L L, the valves P P, and scrapers $q\ q$, constructed and operating as described, and for the purposes set forth.

6. The combination of the arms D D, &c., with the feed-wheel $k$, revolving feed-buckets $c\ c$, &c., and the valves P P, the whole constructed and operating as described, and for the purposes set forth.

7. The furrowers L L, and the manner herein described of attaching and detaching the furrowers, holding them firmly, or allowing them to revolve by means of the devices herein described and set forth.

In testimony that I claim the above-described invention, I have hereunto signed my name this eighth day of August, 1866.

G. W. KNAPP.

Witnesses:
J. F. CALLAN,
F. G. CLAYTON.